United States Patent
Doan et al.

[11] Patent Number: 6,128,611
[45] Date of Patent: Oct. 3, 2000

[54] INTERNET-ENABLED GENERIC APPLICATION PROGRAM FOR ACCESSING HIERARCHICAL DATA

[75] Inventors: Bach Dinh Doan, San Jose; Shyh-Mei Fang Ho, Cupertino, both of Calif.

[73] Assignee: International Business Machines Corporation, Armonk, N.Y.

[21] Appl. No.: 09/070,273

[22] Filed: Apr. 30, 1998

[51] Int. Cl.⁷ .................................................. G06F 17/30
[52] U.S. Cl. .................................................. 707/4; 707/9
[58] Field of Search ........................ 707/1–10, 100–104, 707/200–206; 709/200–253

[56] References Cited

U.S. PATENT DOCUMENTS

| | | | |
|---|---|---|---|
| 5,161,225 | 11/1992 | Abraham et al. | 395/600 |
| 5,212,787 | 5/1993 | Baker et al. | 395/600 |
| 5,280,610 | 1/1994 | Travis, Jr et al. | 395/600 |
| 5,291,583 | 3/1994 | Bapat | 395/500 |
| 5,295,256 | 3/1994 | Bapat | 395/500 |
| 5,297,279 | 3/1994 | Bannon et al. | 395/600 |
| 5,303,379 | 4/1994 | Khoyi et al. | 395/700 |
| 5,329,619 | 7/1994 | Pagé et al. | 395/200 |
| 5,414,812 | 5/1995 | Filip et al. | 395/200 |
| 5,421,015 | 5/1995 | Khoyi et al. | 395/650 |
| 5,426,747 | 6/1995 | Weinreb et al. | 395/400 |
| 5,437,027 | 7/1995 | Bannon et al. | 395/600 |
| 5,440,547 | 8/1995 | Easki et al. | 370/60 |
| 5,442,779 | 8/1995 | Barber et al. | 395/600 |
| 5,452,445 | 9/1995 | Hallmark et al. | 395/600 |
| 5,455,948 | 10/1995 | Poole et al. | 395/650 |
| 5,459,860 | 10/1995 | Burnett et al. | 395/600 |
| 5,471,615 | 11/1995 | Amatsu et al. | 395/200.03 |
| 5,487,064 | 1/1996 | Galand | 370/60 |

(List continued on next page.)

OTHER PUBLICATIONS

1. Muckenhaupt, Kenneth J., "Preserving Current Assets With Objects on MVS White Paper," Mar. 15, 1996, at http://www.s390.ibm.com/products/wp/wrapwp.html.

2. IBM Corporation. "IMS in an Object Oriented World," San Jose, California, Jul. 12, 1995, pp. 1–53.

3. Howe III, Jack L., "IMS/OO—Overview: Objects in IMS Are Closer Than They Appear", IBM Corporation, Overheads from presentation at SHARE '95, Feb. 23, 1995.

(List continued on next page.)

*Primary Examiner*—Ruay Lian Ho
*Attorney, Agent, or Firm*—Gates & Cooper

[57] ABSTRACT

A method, apparatus, and article of manufacture for accessing a hierarchical database. An objects framework models the database as one or more objects. An Internet-enabled generic application program accesses the database via the objects framework. The present invention introduces an Internet-enabled generic application program for accessing hierarchical databases, such as an IMS™ database, by modeling the database into an objects framework and then accessing the database via the objects framework using standard tools, such as the DL/I™ query language for the IMS™ database. The Internet-enabled generic application program dynamically builds a DL/I™ query string based on web browser inputs. The generic application program loads the objects framework to instantiate IMS™ objects and dynamically constructs DL/I™ calls to access the IMS™ database. The generic application program can be used in a number of different environments, such as: (1) DL/I™ batch processing and (2) on-line transactions including both IMS™ and CICS™ transactions. Moreover, the generic application program and objects framework can be executed in any MVS address space, including IMS™ and non-IMS™ address spaces, such as web server address spaces. With this invention, customers can continue to access their business data in IMS™ databases using the latest Internet technology, without relying on legacy application programs and without developing new application programs. Thus, the present invention offers improved IMS™ application programming productivity by supporting IMS™ business objects and data objects, by eliminating complicated DL/I™ programming, and by supporting use of object-oriented programming tools.

39 Claims, 6 Drawing Sheets

U.S. PATENT DOCUMENTS

| | | | |
|---|---|---|---|
| 5,499,371 | 3/1996 | Henninger et al. | 395/700 |
| 5,542,078 | 7/1996 | Martel et al. | 395/600 |
| 5,544,325 | 8/1996 | Denny et al. | 395/200.17 |
| 5,546,582 | 8/1996 | Brockmeyer et al. | 395/650 |
| 5,563,878 | 10/1996 | Blakeley et al. | 370/60 |
| 5,564,050 | 10/1996 | Barber et al. | 395/600 |
| 5,899,990 | 5/1999 | Maritzen et al. | 707/4 |
| 5,933,830 | 8/1999 | Williams | 707/100 |
| 5,983,218 | 11/1999 | Syeda-Mahmood | 707/3 |

OTHER PUBLICATIONS

4. Howe III, Jack L., "Objects in the IMS are Closer Than They Appear", IBM Corporation, Overheard from presentation at IBM Technical Interchange '95, May 20, 1995.

5. "Voyage/C++Client/Server Object Management System," Secant Technologies, Inc., 1995.

6. "Get your Objects with IMS Database Object Technology," IBM Corporation, 1995, pp. 1–3.

7. "Objects in IMS Are Closer Than They Appear,", IBM Corporation–IMS DBobject Services, Mar. 1, 1996.

8. "Object Colection Service," IBM Corporation, Feb. 9, 1996, pp. 1–134.

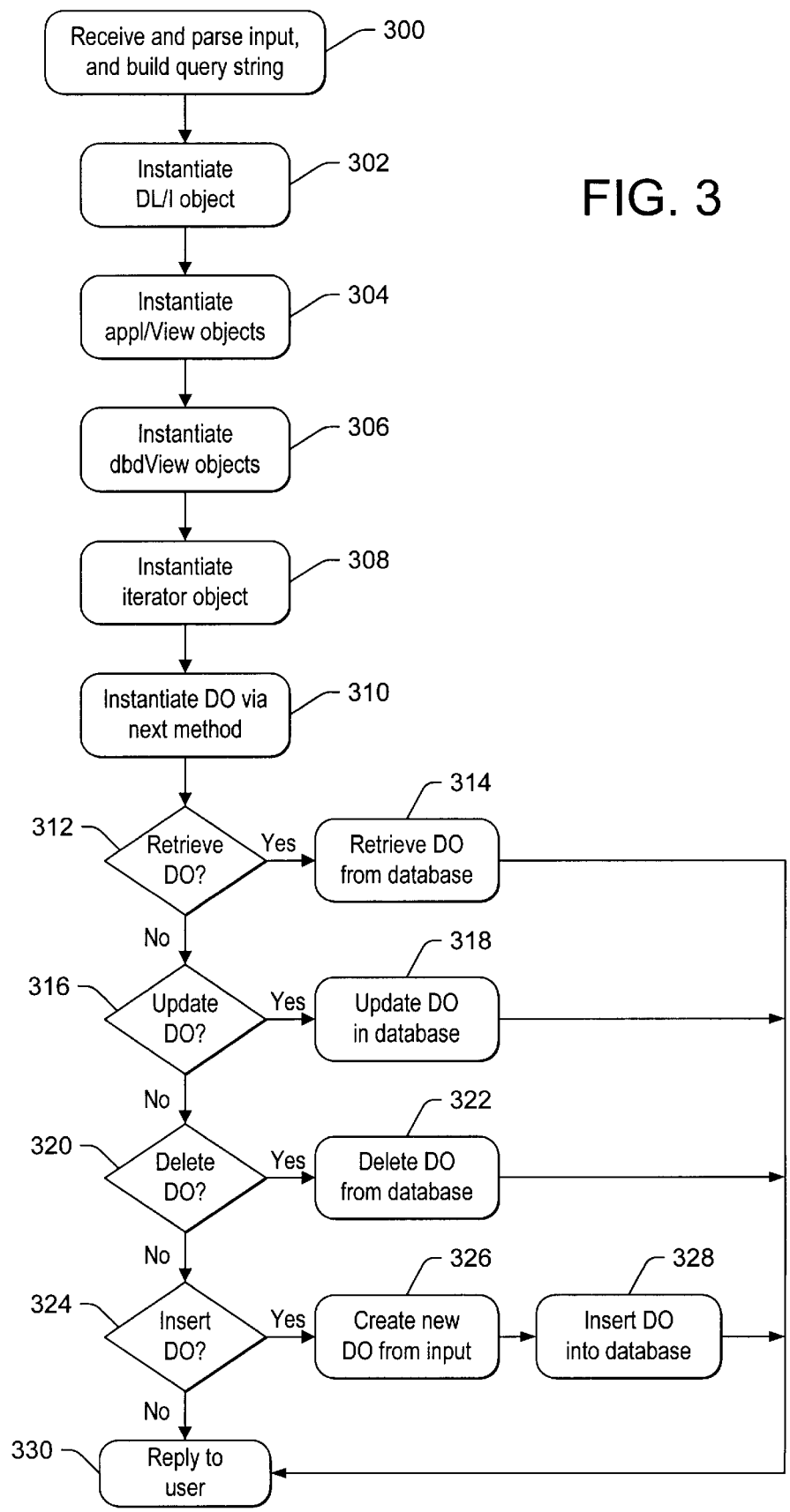

INTERNET-ENABLED GENERIC APPLICATION PROGRAM FOR ACCESSING HIERARCHICAL DATA

CROSS-REFERENCE TO RELATED APPLICATIONS

This application is related to the following co-pending and commonly assigned patent applications:

Utility application Ser. No. 09/070,071, entitled "AN EXECUTION PARADIGM FOR ACCESSING HIERARCHICAL DATA USING AN OBJECT FRAMEWORK," filed on same date herewith, by Kenneth R. Blackman, Shyh-Mei F. Ho, and Thomas Beavers Sander;

Utility application Ser. No. 09/070,274, entitled "A GENERIC EXECUTION MODEL FOR ISOLATING APPLICATIONS FROM UNDERLYING DATABASES," filed on same date herewith, by Kenneth R. Blackman, Shyh-Mei F. Ho, and Thomas Beavers Sander;

Utility application Ser. No. 09/070,528, entitled "AN OBJECT-ORIENTED PROGRAMMING MODEL FOR ACCESSING HIERARCHICAL DATABASES," filed on same date herewith, by Bach D. Doan and Shyh-Mei F. Ho;

Utility application Ser. No. 09/070,227, entitled "GENERATING AN INTERNET APPLICATION FOR ACCESSING A HIERARCHICAL DATABASE," filed on same date herewith, by Attila J. Fogarasi, Shyh-Mei F. Ho, Wai-Lee D. Ling, and Kevin M. McBride;

Provisional Application Serial No. 60/067,292, entitled "A USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson;

Utility application Ser. No. 09/042,238, entitled "A USER INTERFACE FOR CREATING PROGRAM SPECIFICATIONS FOR ACCESSING DATABASE PERSISTENT OBJECTS," filed on Mar. 13, 1998, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, which claims the benefit under 35 U.S.C. §119(e) of Provisional Application Serial No. 60/067,292 above;

Utility application Ser. No. 08/949,638, entitled "A USER INTERFACE FOR CREATING CLASS DEFINITIONS AND IMPLEMENTATIONS FOR DATABASE PERSISTENT OBJECTS," filed on Oct. 14, 1997, by Mark Alan Bach, Shyh-Mei F. Ho, Kevin Michael McBride, H. Moncrief Rowe-Anderson and Thomas Beavers Sander, now U.S. Pat. No. 5,924,107;

Utility application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739;

Utility application Ser. No. 08/736,762, entitled "A FRAMEWORK FOR OBJECT-ORIENTED ACCESS TO NON-OBJECT-ORIENTED DATABASES," filed on Oct. 25, 1996, by Kenneth R. Blackman and Jack L. Howe III, now U.S. Pat. No. 5,799,313;

Utility application Ser. No. 08/736,763, entitled "A METHOD FOR REPRESENTING NON-OBJECT-ORIENTED DATABASES USING A COLLECTION OF COLLECTIONS DATA MODEL," filed on Oct. 25, 1996, by Kenneth R. Blackman and Jack L. Howe III, now U.S. Pat. No. 5,794,248;

Utility application Ser. No. 08/738,294, entitled "A METHOD FOR THE INCREMENTAL PRESENTATION OF NON-OBJECT-ORIENTED DATABASES USING AN OBJECT-ORIENTED QUERYABLE DATABASE COLLECTION," filed on Oct. 25, 1996, by Kenneth R. Blackman and Jack L. Howe III, now U.S. Pat. No. 5,781,907;

Utility application Ser. No. 08/738,104, entitled "A QUERY SYNTAX FOR ACCESSING NON-RELATIONAL, NON-OBJECT-ORIENTED DATABASES," filed on Oct. 25, 1996, by Kenneth R. Blackman and Jack L. Howe III, now U.S. Pat. No. 5,778,358;

Utility application Ser. No. 08/738,082, entitled "A QUERY PARSER FOR ACCESSING NON-RELATIONAL, NON-OBJECT-ORIENTED DATABASES," filed on Oct. 25, 1996, by Kenneth R. Blackman and Jack L. Howe III, now U.S. Pat. No. 5,778,379;

Utility application Ser. No. 08/738,330, entitled "A METHOD FOR USING A DATABASE CURSOR FOR THE INCREMENTAL PRESENTATION OF QUERY RESULTS WHEN TRAVERSING IMPLIED COLLECTIONS IN NON-OBJECT-ORIENTED DATABASES," filed on Oct. 25, 1996, by Kenneth R. Blackman and Jack L. Howe III, now U.S. Pat. No. 5,787,436;

Utility application Ser. No. 08/736,759, entitled "A METHOD FOR REPRESENTING DATA FROM NON-RELATIONAL, NON-OBJECT-ORIENTED DATABASES AS QUERYABLE DATABASE PERSISTENT OBJECTS," filed on Oct. 25, 1996, by Kenneth R. Blackman and Jack L. Howe III, now U.S. Pat. No. 5,794,247;

Utility application Ser. No. 08/736,764, entitled "A METHOD FOR ENCAPSULATING DATA FROM NON-OBJECT-ORIENTED DATABASES AS DATABASE PERSISTENT OBJECTS," filed on Oct. 25, 1996, by Kenneth R. Blackman and Jack L. Howe III, now U.S. Pat. No. 5,765,161;

Utility application Ser. No. 08/738,103, entitled "A METHOD FOR USING QUERYABLE PERSISTENT IDENTIFIERS TO LOCATE DATA FOR DATABASE PERSISTENT OBJECTS IN NON-OBJECT-ORIENTED DATABASES," filed on Oct. 25, 1996, by Kenneth R. Blackman and Jack L. Howe III, now U.S. Pat. No. 5,765,163;

Utility application Ser. No. 08/736,983, entitled "A METHOD FOR INTERFACING QUERYABLE DATABASE PERSISTENT OBJECTS TO NON-RELATIONAL, NON-OBJECT-ORIENTED DATABASES," filed on Oct. 25, 1996, by Kenneth R. Blackman and Jack L. Howe III, now U.S. Pat. No. 5,761,671;

Utility application Ser. No. 08/736,952, entitled "A METHOD FOR MANAGING QUERYABLE DATABASE PERSISTENT OBJECTS AND QUERYABLE DATABASE COLLECTIONS IN AN OBJECT-ORIENTED ENVIRONMENT," filed on Oct. 25, 1996, by Kenneth R. Blackman and Jack L. Howe III, now U.S. Pat. No. 5,765,162;

Utility application Ser. No. 08/736,765, entitled "A METHOD FOR CATALOGING DATABASE CHARACTERISTICS AND DEFINING AND GENERATING DATABASE PERSISTENT OBJECTS," filed on Oct. 25, 1996, by Kenneth R. Blackman and Jack L. Howe III, now U.S. Pat. No. 5,737,597;

Utility application Ser. No. 08/047,786, entitled "A METHOD FOR CATALOGING DATABASE CHARAC- TERISTICS AND DEFINING AND GENERATING DATABASE PERSISTENT OBJECTS," filed on Mar. 25, 1998, by Kenneth R. Blackman and Jack L. Howe III, which is a continuation of U.S. Pat. No. 5,737,597 above;

Utility application Ser. No. 08/736,922, entitled "A METHOD FOR CAPTURING AND CATALOGING DATABASE CHARACTERISTICS TO DEFINE DATABASE PERSISTENT OBJECTS," filed on Oct. 25, 1996, by Kenneth R. Blackman and Jack L. Howe III, now U.S. Pat. No. 5,761,671;

Utility application Ser. No. 08/738,102, entitled "A METHOD FOR CAPTURING AND CATALOGING SPECIFICATIONS FOR DATABASE PERSISTENT CLASSES," filed on Oct. 25, 1996, by Kenneth R. Blackman and Jack L. Howe III, now U.S. Pat. No. 5,737,597;

Utility application Ser. No. 08/738,105, entitled "A METHOD FOR USING A NON-OBJECT-ORIENTED DATABASE AS A GENERIC PERSISTENT DATABASE FOR PERSISTENT OBJECTS," filed on Oct. 25, 1996, by Kenneth R. Blackman and Jack L. Howe III; now U.S. Pat. No. 5,809,509 and Utility application Ser. No. 08/736,761, entitled "A METHOD FOR CAPTURING AND CATALOGING PROGRAM CHARACTERISTICS FOR THE USAGE OF DATABASE PERSISTENT CLASSES," filed on Oct. 25, 1996, by Kenneth R. Blackman and Jack L. Howe III; now U.S. Pat. No. 5,764,979 all of which applications are incorporated by reference herein.

BACKGROUND OF THE INVENTION

1. Field of the Invention

The present invention relates generally to computerized methods for accessing databases, and in particular, to an Internet-enabled generic application program for accessing hierarchical data using an object-oriented framework.

2. Description of Related Art

It is well known in the art to use database management systems, such as IBM's IMS™ (Information Management System) database management system, to manage computerized databases. Indeed, IMS™ has been used for decades and remains in use today. Currently, there is a need to access such "legacy" databases using application programs specially adapted for Internet access. However, there are few tools available to assist developers.

Today, either an IMS™ DB batch or an IMS™ or CICS™ on-line transaction application program is required to access an IMS™ database. Developers either have to use existing IMS™ application programs or they have to develop new application programs and then perform a system generation (i.e., SYSGEN) to define new transactions to an IMS™ system. Because of the complexity of developing new IMS™ application programs, very few have been developed in recent years.

Therefore, there is a need in the art for technologies that use existing legacy IMS™ application programs to provide Internet access. Moreover, such technologies should minimize the need for developing new application programs.

SUMMARY OF THE INVENTION

To overcome the limitations in the prior art described above, and to overcome other limitations that will become apparent upon reading and understanding the present specification, the present invention discloses a method, apparatus, and article of manufacture for accessing a hierarchical database. An objects framework models the database as one or more objects. An Internet-enabled generic application program accesses the database via the objects framework.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 3 is a flowchart illustrating the steps performed by the generic application program and objects framework according to the present invention.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention introduces an Internet-enabled generic application program for accessing hierarchical databases, such as an IMS™ database, by modeling the database into an objects framework and then accessing the database via the objects framework using standard tools, such as the DL/I™ query language for the IMS™ database. The Internet-enabled generic application program dynamically builds a DL/I™ query string based on web browser inputs. The generic application program loads the objects framework to instantiate IMS™ objects and dynamically constructs DL/I™ calls to access the IMS™ database.

The generic application program can be used in a number of different environments, such as: (1) DL/I™ batch processing and (2) on-line transactions including both IMS™ and CICS™ transactions. Moreover, the generic application program and objects framework can be executed in any MVS address space, including IMS™ and non-IMS™ address spaces, such as web server address spaces.

With this invention, customers can continue to access their business data in IMS™ databases using the latest Internet technology, without relying on legacy application programs and without developing new application programs. Thus, the present invention offers improved IMS™ application programming productivity by supporting IMS™ business objects and data objects, by eliminating complicated DL/I™ programming, and by supporting use of object-oriented programming tools.

Hardware Environment

Figure 1:
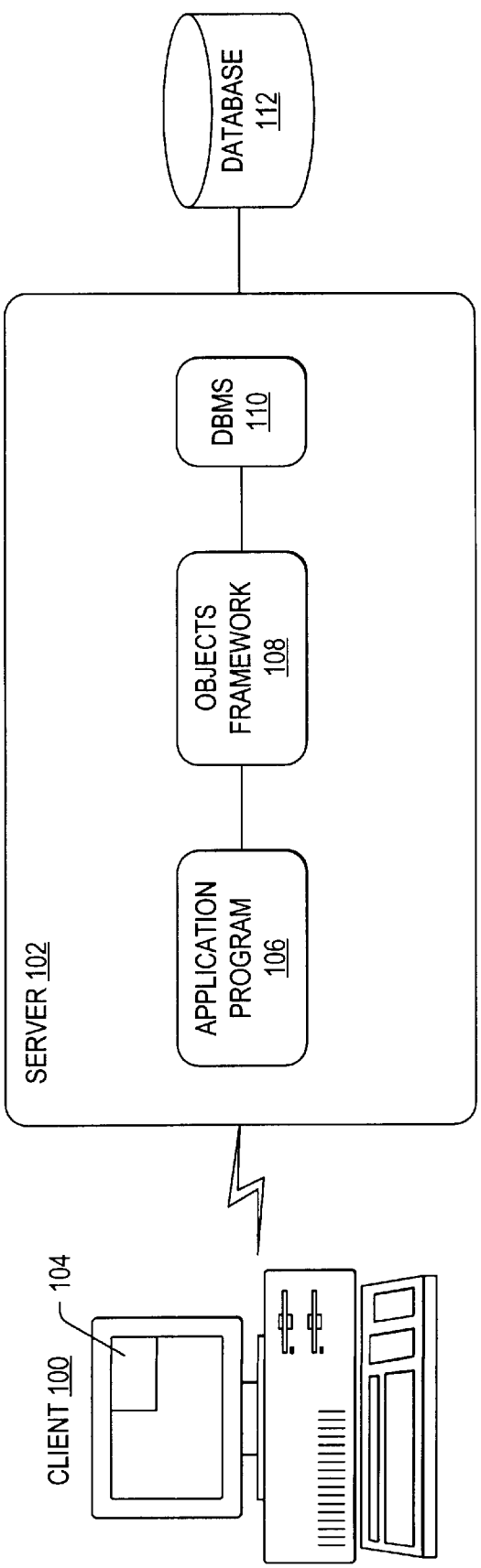
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components such as data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the IMS™ database management system (DBMS) offered by IBM Corporation. Those skilled in the art will recognize, however, that the present invention may be applied to any database and associated database management system.

The present invention is generally implemented using five major components executed by client computers 100 and server computers 102, including a client program 104, object-oriented generic application program 106, objects framework 108, database management system (DBMS) 110 and database 112, wherein each of these components comprise instructions and/or data. The client program 104 provides a user interface, the object-oriented generic application program 106 performs application functions, the objects framework 108 materializes data retrieved from the database 112 as objects, and the database management system 110 controls access to the database 112.

Generally, these instructions and/or data 104–112 are all tangibly embodied in or retrievable from a computer-readable device, medium, or carrier, e.g., a data storage device, a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Objects Framework Model

Figure 2:
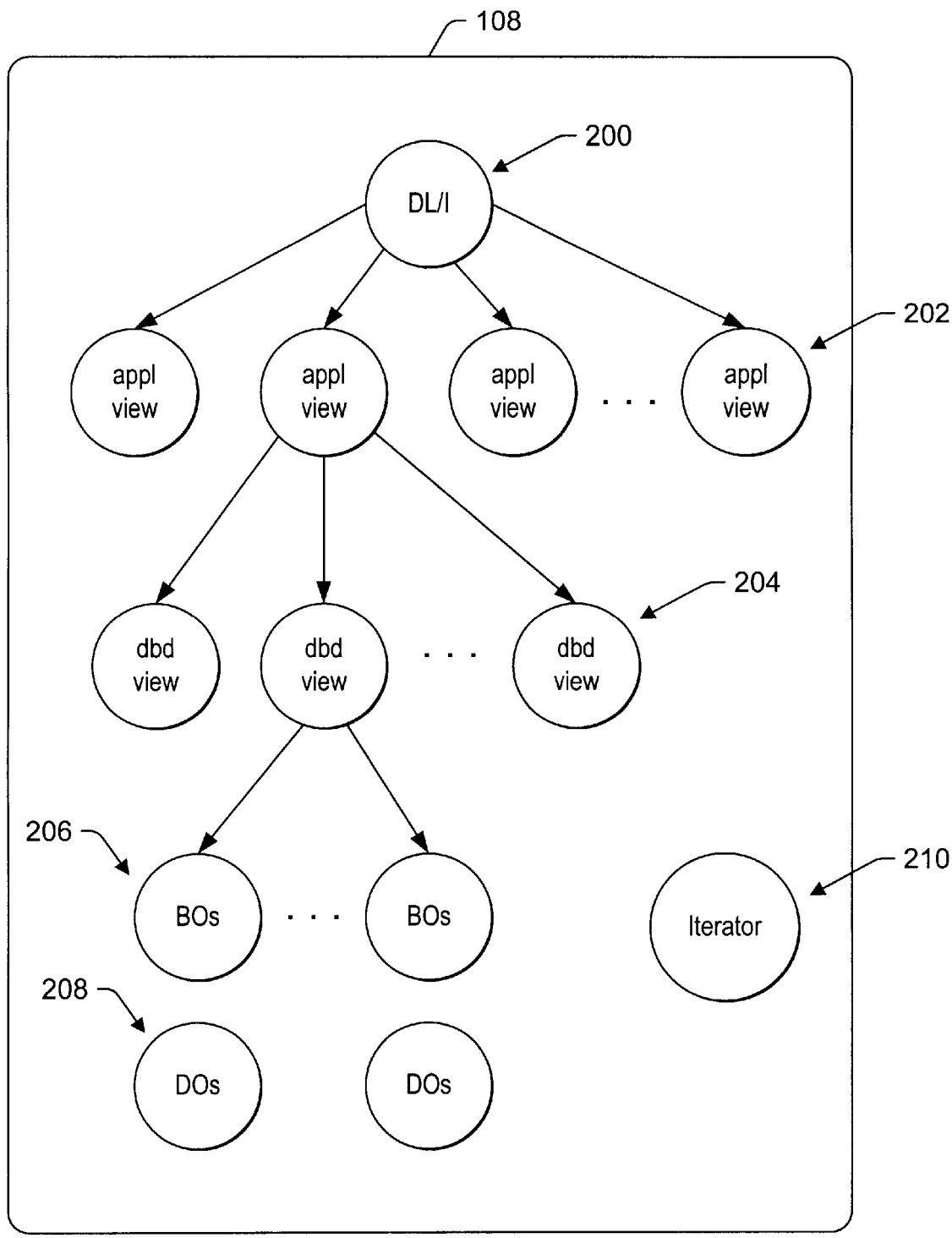
FIG. 2 is a block diagram illustrating a layered processing model used in the objects framework according to the present invention.

FIG. 2 is a block diagram illustrating a layered processing model provided by the objects framework 108 according to the present invention. The layered processing model corresponds to the application views, database definitions, and data defined and stored in an IMS™ database management system.

The objects framework 108 comprises a C++ class library that interfaces to the generic application program 106. The generic application program 106 dynamically loads previously defined objects into the objects framework 108 to access the database 112 during execution time. The objects loaded into the objects framework 108 include a DL/I™ object 200, one or more applView objects 202, one or more dbdView objects 204, one or more business objects (BOs) 206, one or more data objects (DOs) 208, and an iterator object 210.

The generic application program 106 first loads the objects framework 108 class library by instantiating a DL/I™ object 200, one applView object 202, and one dbdView object 204. The objects framework 108 then dynamically loads the class library for the BOs 206 and DOs 208 requested by the generic application program 106 to create an iterator object 210. The iterator object 210 then instantiates the BOs 206 and their corresponding DOs 208 during execution.

All the class objects, except the iterator class 210, are organized into a tree structure to represent the hierarchical structure of data retrieved from the database 112. In the preferred embodiment, the tree structure ensures that there is exactly one path through the hierarchy to each object and consequently exactly one identity, i.e., segment occurrence, for an object.

Each of the objects encapsulates a logical unit of data retrieved from the database 112 and includes member functions for manipulating the encapsulated data. The structure and member functions of these various objects are described in more detail below.

DL/I Object

In the preferred embodiment, the database 112 is an IMS™ database 112, which is an "application views database". The DL/I™ object 200 is the root of the objects framework 108, and thus is a root for a collection of application views (applView objects 202) in the IMS™ database 112. Thus, the objects framework 108 provides for multiple application views of the database 112 in a layered processing model.

applView Object

Each applView object 202 represents an "application (appl) view" of the IMS™ database 112. Each applView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of segments in the IMS™ database 112 as well as the record layouts, including formatting information, for the records in the database 112. The dbdView objects 204 also define the hierarchy to help locate segments for the database 112. In the objects framework 108, each dbdView object 204 contains and manages a collection of data objects (DOs) 206 and business objects (BOs) 208.

Business Objects and Data Objects

The IMS™ database 112 is comprised of a collection of segment types, and each segment type contains a collection of segment occurrences. A data object (DO) 208 class represents each segment type and each segment occurrence is represented by an instance of the class, i.e., a DO 208. Thus, the DOs 208 provide a direct mapping of the data within each segment occurrence. Moreover, the object-oriented generic application program 106 can directly access the data of the segment occurrence by interacting with the DO 208 via the objects framework 108 to perform the necessary operations on the database 112.

In addition, a business object (BO) 206 may be instantiated with a DO 208 to provide business logic for the generic application program 106. In such an embodiment, the generic application program 106 accesses the business logic via the BO 206, which in turns invokes the methods of its corresponding DO 208 to perform the necessary operations on the database 112 to manage its essential state data. Thus, the DO 208 isolates the BO 206 from the specifics of the database 112. With the BO/DO model, customers can easily separate business logic from the physical data access logic to accommodate more diversified business needs. Furthermore, because of the nature of the separation of BO 206 and DO 208, the objects framework 108 can be easily extended to other non-hierarchical datastores, e.g. DB2™.

Iterator Object

In the objects framework 108, the generic application program 106 uses a DL/I™ query string to access the IMS™ database 112. After the generic application program 106 receives and parses the user input, it first instantiates a desired applView object 202. If the associated DL/I™ object 200 has not been instantiated yet, this also results in its instantiation as the root of the objects framework 108 and the root for the collection of application views (applView objects 202) in the IMS™ database 112. The generic application program 106 then provides the DL/I™ query string to an "evaluate" method of the applView object 202. The applView object 202 builds a DL/I segment search argument list based on the values within the DL/I™ query string.

The generic application program 106 then creates the iterator object 210 that is used to point to an incrementally-materialized collection of BOs 206 and DOs 208 that meet the search criteria specified in the DL/I™ query string. The "evaluate" method of the applView object 202 reads the DL/I™ query string and sets a pointer in the iterator object 210 to point to the collection of BOs 206 and DOs 208 that meet the DL/I™ segment search criteria.

A "next" method of the iterator object 210 is invoked to instantiate each BO 206 and/or DO 208 from the database 112, wherein the resulting state data of the BO 206 and DO 208 are cached in the memory of the server computer 104. Using the pointer and "next" method of the iterator object 202, the generic application program 106 can iterate through a collection of BOs 206 and/or DOs 208 to materialize one BO 206 and/or DO 208 after the other in the memory of the server computer 102.

Each BO 206 and DO 208 class contains both "get" and "set" methods associated for each class attribute. The generic application program 106 can then retrieve or update the attributes of a DO 208 by invoking these methods. Preferably, no I/O operations are performed at the invocation of these "get" and "set" methods, and all state data is changed in memory only until a commit occurs.

As described above, the BOs 206 are used by the generic application program 106 to perform needed business logic on the associated DOs 208. In addition, the generic application program 106 can perform DL/I™ operations (e.g., retrieve, update, delete and insert) using methods of the BOs 206. The BO 206 will, in turn, invoke the methods of its corresponding DO 208 to perform actual DL/I™ calls.

The following methods exemplify the BO 206 methods that allow the generic application program 106 to retrieve a DO 208 from the database 112, to update state data for the DO 208 in the database 112, to add a new instance of the DO 208 to the database 112, or to delete a DO 208 from the database 112:

RetrieveFromDS()

UpdateToDS()

InsertToDS()

DeleteFromDS()

In a preferred embodiment, only the above four methods will result in actual I/O operations on the database 112.

Example Generic Application Program

Following is a sample object-oriented generic application program 106 according to the present invention:

```
// generic application program
main()
{
    // receive input from web server, and parse the input for an
    // application view, query string, and/or desired operation
    handle_request(inputDataString);
    // instantiate desired applView object (and DL/I object if necessary)
    applView_SSM applView (applViewName);
    // Dynamically build the DL/I query string based on the input data
    build_query_string(inputDataString)
    // instantiate the iterator object and set its pointer using the
    // "evaluate" method and query string
    iterator* ltr = applView.evaluate(queryString);
    // use "next" method to instantiate a BO and its corresponding DO
    BO*pObj=ltr->next();
    // use indicated methods to retrieve, update, delete, or
    // insert BOs and DOs
    switch(operation)
    {
            // Retrieve DO
            case 0: pObj->RetrieveFromDS();
                    break;
            // Update DO
            case 1: pObj->UpdateToDS();
                    break;
            // Delete DO
            case 2: pObj->DeleteFromDS();
                    break;
            // Insert DO
            case 3: DO*pObj=ltr->newObject();
                    pObj->InsertToDS();
                    break;
    }
    // generate reply
    handle_reply(DO);
}
```

Following is an example DL/I™ query string that could be used by the object-oriented generic application program 106 to retrieve DOs 208 from the database 112:

SELECT doClassNameC

FROM databaseViewName

WHERE doClassNameA.keyname relop keyvalue,
   doClassNameB.keyname relop keyvalue,
   doClassNameC.keyname relop keyvalue where "relop" is a relational operator, such as:

EQ or = or =

GT or > or >

LT or < or <

GE or >= or =>
LE or <= or =<
NE or != or =!
AND or & or *
OR or | or +

Logic of the Application Program

FIG. 3 is a flowchart illustrating the steps performed by the generic application program 106 and objects framework 108 according to the present invention.

Block 300 represents the generic application program 106 receiving and parsing user input received from the web browser via a web server and dynamically constructing a DL/I™ query string based on the parsed input. Usually, the input is in an HTTP format, although other protocols may be used as well. For example, a web server could parse the input itself and then provide the parsed input to the generic application program 106 via a Common Gateway Interface (CGI), Netscape Server API (NSAPI), Internet Connection Server API (ICAPI), or other protocol.

Block 302 represents the DL/I™ object 200 of the objects framework 108 being instantiated in the memory of the server computer 102. Usually, this occurs either when the objects framework 108 is loaded or when the generic application program 106 first requests an applView object 202.

Block 304 represents the generic application program 106 instantiating the requested applView object 202 in the memory of the server computer 102.

Block 306 represents the dbdView objects 204 of the objects framework 108 being instantiated in the memory of the server computer 102. Usually, this occurs either when the objects framework 108 is loaded or when the generic application program 106 first requests an applView object 202.

Block 308 represents the generic application program 106 instantiating the iterator object 210 in the memory of the server computer 102 and then setting its object pointer by invoking the "evaluate" method with a DL/I query string.

Block 310 represents the generic application program 106 invoking the "next" member function or method of the iterator object 210 to instantiate/materialize a BO 206 and/or DO 208 in the memory of the server computer 102.

Block 312 is a decision block that represents the generic application program 106 determining whether the requested operation is a request to retrieve a DO 208. If so, control transfers to Block 314; otherwise, control transfers to Block 316. Block 314 represents the generic application program 106 retrieving data from the database 112 via a method of the DO 208. Thereafter, control transfers to Block 330.

Block 316 is a decision block that represents the generic application program 106 determining whether the requested operation is a request to update a DO 208. If so, control transfers to Block 318; otherwise, control transfers to Block 320. Block 318 represents the generic application program 106 updating data in the database 112 via a method of the DO 208. Thereafter, control transfers to Block 330.

Block 320 is a decision block that represents the generic application program 106 determining whether the requested operation is a request to delete a DO 208. If so, control transfers to Block 322; otherwise, control transfers to Block 324. Block 322 represents the generic application program 106 deleting data from the database 112 via a method of the DO 208. Thereafter, control transfers to Block 330.

Block 324 is a decision block that represents the generic application program 106 determining whether the requested operation is a request to insert a DO 208. If so, control transfers to Block 326; otherwise, control transfers to Block 330. Block 326 represents the generic application program 106 creating or instantiating a new DO 208 and Block 328 represents the generic application program 106 inserting data into the database 112 via a method of the DO 208. Thereafter, control transfers to Block 330.

Block 330 represents the generic application program 106 replying to the user at the web browser via the web server. Usually, the output is in an HTML format, although other protocols may be used as well. For example, the generic application program 106 could provide a web server with the output for formatting by the web server itself.

Operating Environments

Figure 4A:
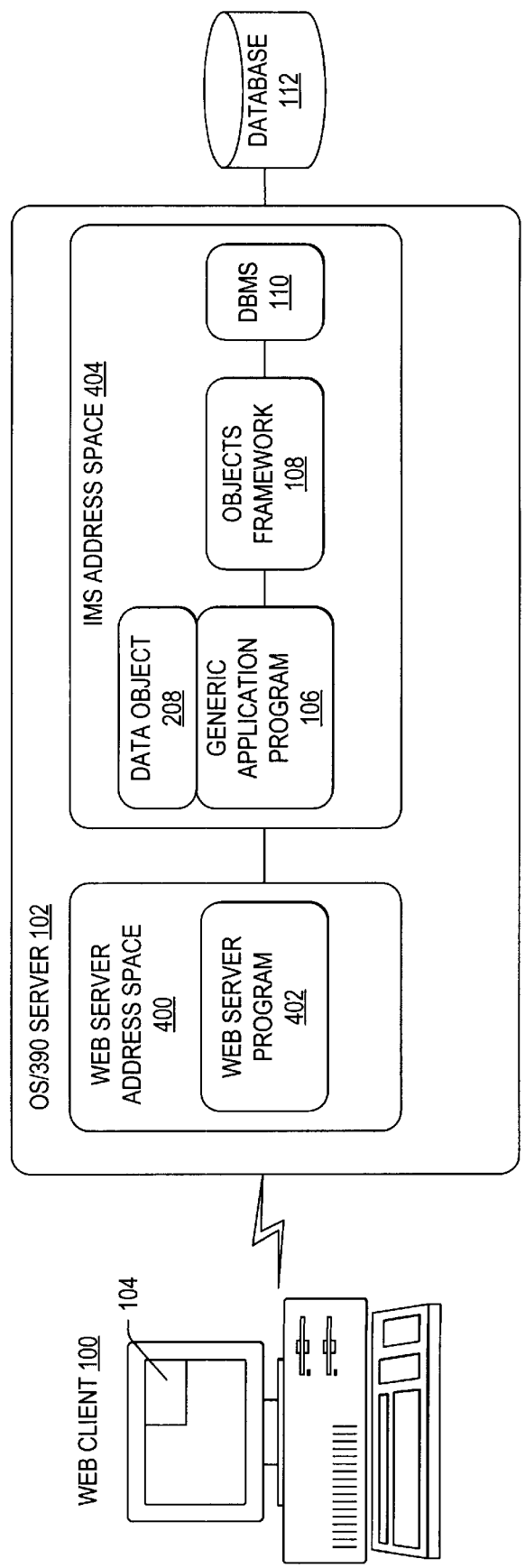
FIGS. 4A, 4B, and 4C illustrate exemplary operating environments for the present invention.
Figure 4B:
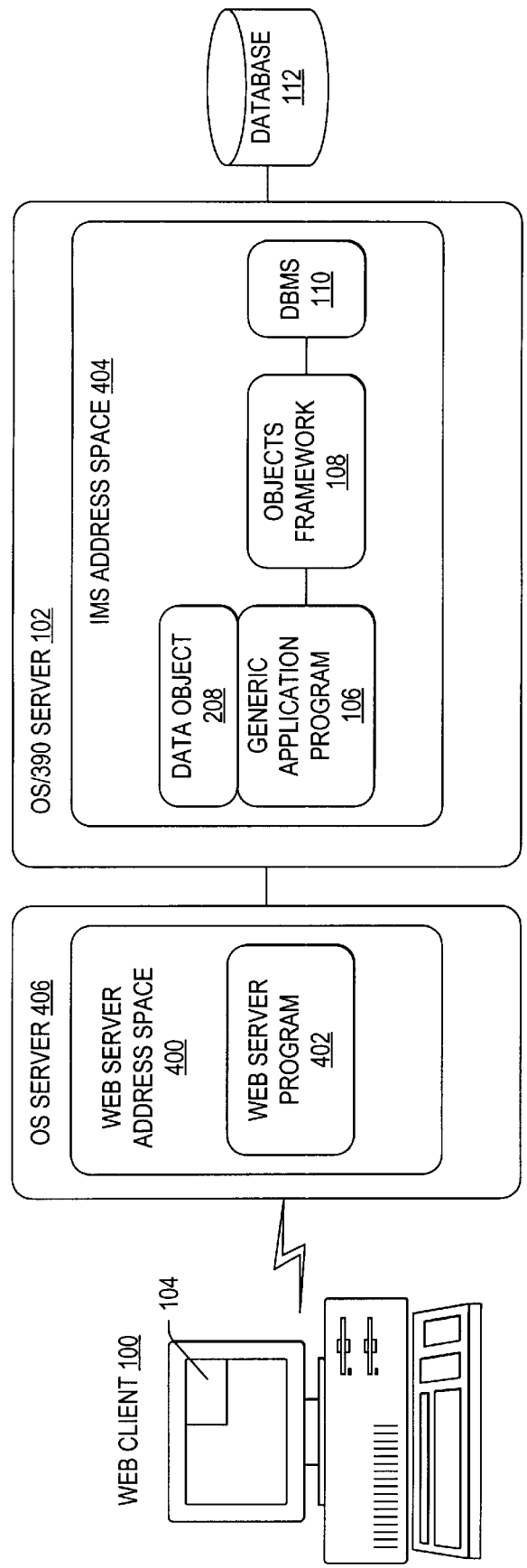
Figure 4C:
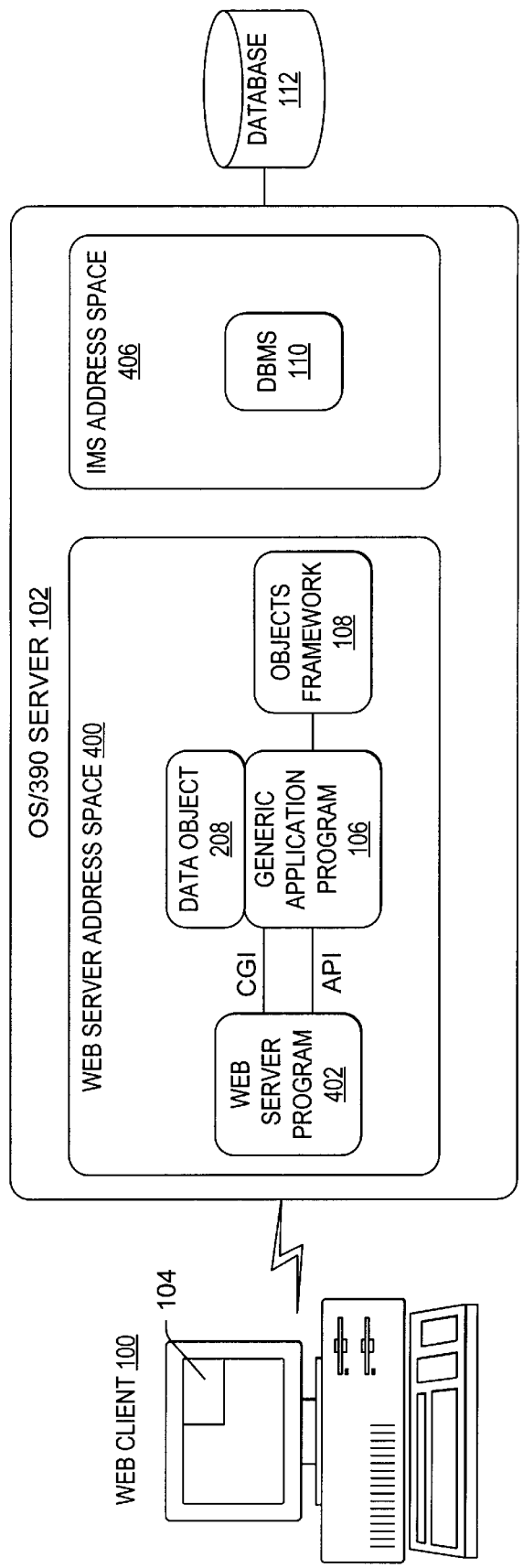

FIGS. 4A, 4B, and 4C illustrate exemplary operating environments for the present invention. Each of these embodiments illustrate an Internet-enabled client/server structure.

FIG. 4A illustrates an embodiment of the present invention where a web client computer 100 executes a web browser 104 and is connected via the Internet to a server computer 102. The server computer 102 has a web server address space 400 that includes a web server program 402. The server computer 102 also has a separate IMS™ address space 404 that includes the generic application program 106, objects framework 108, DBMS 110, as well as DOs 208.

FIG. 4B illustrates an embodiment of the present invention where a web client computer 100 executes a web browser 104 and is connected via the Internet to a web server computer 406. The web server computer 406 has a web server address space 400 that includes a web server program 402, and is connected to a separate database server computer 102. The database server computer 102 has an IMS™ address space 404 that includes the generic application program 106, objects framework 108, DBMS 110, as well as DOs 208.

FIG. 4C illustrates an embodiment of the present invention where a web client computer 100 executes a web browser 104 and is connected via the Internet to a server computer 102. The server computer 102 has a web server address space 400 that includes a web server program 402, the generic application program 106, objects framework 108, as well as DOs 208. The server computer 102 also has a separate IMS™ address space 404 that includes the DBMS 110.

Of course, those skilled in the art will recognize that these various embodiments are not exhaustive, and that other embodiments could also be used. For example, the generic application program 106, objects framework 108, and/or DBMS 110 could each be supported as a stand-alone function in any OS/390™ address space.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. Instead, the present invention could be used to model other types of databases and datastores.

In summary, the present invention discloses a method, apparatus, and article of manufacture for accessing a hierarchical database. An objects framework models the database as one or more objects. An Internet-enabled generic application program accesses the database via the objects framework.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized apparatus for accessing a hierarchical database, comprising:
   (a) a computer;
   (b) one or more data objects that:
      (i) provide a direct mapping of data within the hierarchical database; and
      (ii) encapsulate data retrieved from the hierarchical database;
   (c) an objects framework, executed by the computer, for modeling the hierarchical database as the one or more data objects; and
   (d) an Internet-enabled generic application program, executed by the computer, for accessing the hierarchical database via the objects framework.

2. The apparatus of claim 1, wherein the objects framework comprises a C++ class library that interfaces to the application program.

3. The apparatus of claim 1, wherein the Internet-enabled generic application program further comprises means for dynamically instantiating data from the database as the one or more data objects using the objects framework.

4. The apparatus of claim 1, wherein the data objects correspond to application views, database definitions, and data defined and stored in the database.

5. The apparatus of claim 1, wherein the application program dynamically loads previously defined objects into the objects framework to access the database during execution time.

6. The apparatus of claim 1, wherein an application program directly accesses the data in the database by interacting with the data object.

7. The apparatus of claim 1, wherein the data object comprises a business object that provides business logic for the application program.

8. The apparatus of claim 7, wherein the business object invokes one or more methods of the data object to perform the necessary operations on the database.

9. The apparatus of claim 7, wherein the data object isolates the business object from specifics of the database.

10. The apparatus of claim 1, wherein the Internet-enabled generic application program further comprises means for accepting input from a web browser, means for dynamically constructing queries to access the database using the accepted input from the web browser, and means for generating a response to the accepted input using results from the dynamically constructed queries.

11. The apparatus of claim 10, wherein the Internet-enabled generic application program and the objects framework are executed by the computer in an address space separate from a web server.

12. The apparatus of claim 1, wherein the Internet-enabled generic application program and the objects framework are executed by the computer in a same address space as a web server.

13. The apparatus of claim 1, wherein the Internet-enabled generic application program accesses the hierarchical database via a web server executed by a second computer connected to the computer.

14. A computerized method for accessing a hierarchical database, comprising:
   (a) executing an objects framework in a computer to model the database as one or more data objects, wherein the one or more data objects:
      (i) provide a direct mapping of data within the hierarchical database; and
      (ii) encapsulate data retrieved from the hierarchical database; and
   (b) executing an Internet-enabled generic application program in the computer to access the hierarchical database via the objects framework.

15. The computerized method of claim 14, wherein the objects framework comprises a C++ class library that interfaces to the application program.

16. The computerized method of claim 14 further comprising the Internet-enabled generic application dynamically instantiating data from the database as the one or more data objects using the objects framework.

17. The computerized method of claim 14, wherein the data objects correspond to application views, database definitions, and data defined and stored in the database.

18. The computerized method of claim 14 further comprising the application program dynamically loading previously defined objects into the objects framework to access the database during execution time.

19. The computerized method of claim 14 further comprising the application program directly accessing the data in the database by interacting with the data object.

20. The computerized method of claim 14 further comprising the data object providing a business object with business logic for the application program.

21. The computerized method of claim 20 further comprising the business object invoking one or more methods of the data object to perform the necessary operations on the database.

22. The computerized method of claim 20 further comprising the data object isolating the business object from specifics of the database.

23. The computerized method of claim 14 further comprising:
   the Internet-enabled generic application program accepting input from a web browser;
   the Internet-enabled generic application program dynamically constructing queries to access the database using the accepted input from the web browser; and
   the Internet-enabled generic application program generating a response to the accepted input using results from the dynamically constructed queries.

24. The computerized method of claim 23, wherein the Internet-enabled generic application program and the objects framework are executed by the computer in an address space separate from a web server.

25. The computerized method of claim 14, wherein the Internet-enabled generic application program and the objects framework are executed by the computer in a same address space as a web server.

26. The computerized method of claim 14, wherein the Internet-enabled generic application program accesses the hierarchical database via a web server executed by a second computer connected to the computer.

27. A program storage medium readable by a computer, the medium embodying one or more instructions executable by the computer to perform method steps for accessing a hierarchical database, the method comprising:
   (a) executing an objects framework in a computer to model the database as one or more data objects, wherein the one or more data objects:
      (i) provide a direct mapping of data within the hierarchical database; and
      (ii) encapsulate data retrieved from the hierarchical database; and
   (b) executing an Internet-enabled generic application program in the computer to access the hierarchical database via the objects framework.

28. The program storage medium of claim 27, wherein the objects framework comprises a C++ class library that interfaces to the application program.

29. The program storage medium of claim 27, the method further comprising the Internet-enabled generic application dynamically instantiating data from the database as the one or more data objects using the objects framework.

30. The program storage medium of claim 27, wherein the data objects correspond to application views, database definitions, and data defined and stored in the database.

31. The program storage medium of claim 27, the method further comprising the application program dynamically loading previously defined objects into the objects framework to access the database during execution time.

32. The program storage medium of claim 27, the method further comprising the application program directly accessing the data in the database by interacting with the data object.

33. The program storage medium of claim 27, the method further comprising the data object providing a business object with business logic for the application program.

34. The program storage medium of claim 33, the method further comprising the business object invoking one or more methods of the data object to perform the necessary operations on the database.

35. The program storage medium of claim 33, the method further comprising the data object isolating the business object from specifics of the database.

36. The program storage medium of claim 27, the method further comprising:
   the Internet-enabled generic application program accepting input from a web browser;
   the Internet-enabled generic application program dynamically constructing queries to access the database using the accepted input from the web browser; and
   the Internet-enabled generic application program generating a response to the accepted input using results from the dynamically constructed queries.

37. The program storage medium of claim 36, wherein the Internet-enabled generic application program and the objects framework are executed by the computer in an address space separate from a web server.

38. The program storage medium of claim 27, wherein the Internet-enabled generic application program and the objects framework are executed by the computer in a same address space as a web server.

39. The program storage medium of claim 27, wherein the Internet-enabled generic application program accesses the hierarchical database via a web server executed by a second computer connected to the computer.

* * * * *

UNITED STATES PATENT AND TRADEMARK OFFICE
CERTIFICATE OF CORRECTION

PATENT NO. : 6,128,611
DATED : October 3, 2000
INVENTOR(S) : Bach Dinh Doan and Shyh-Mei Fang Ho It is certified that error appears in the above-identified patent and that said Letters Patent is hereby corrected as shown below:

<u>Title page,</u>
Item [56], References Cited, U.S PATENT DOCUMENTS, "Pagéet al." should read -- Pagé et al. --.

OTHER PUBLICATIONS,
"Voyage/C++" should read -- Voyager/C++ --.
"Colection" should read -- Collection --.

Signed and Sealed this

Twenty-third Day of April, 2002

Attest:

Attesting Officer

JAMES E. ROGAN
*Director of the United States Patent and Trademark Office*